Aug. 4, 1964 M. ANNIS ETAL 3,142,908
WAVE GENERATING APPARATUS
Filed July 19, 1962 2 Sheets-Sheet 1
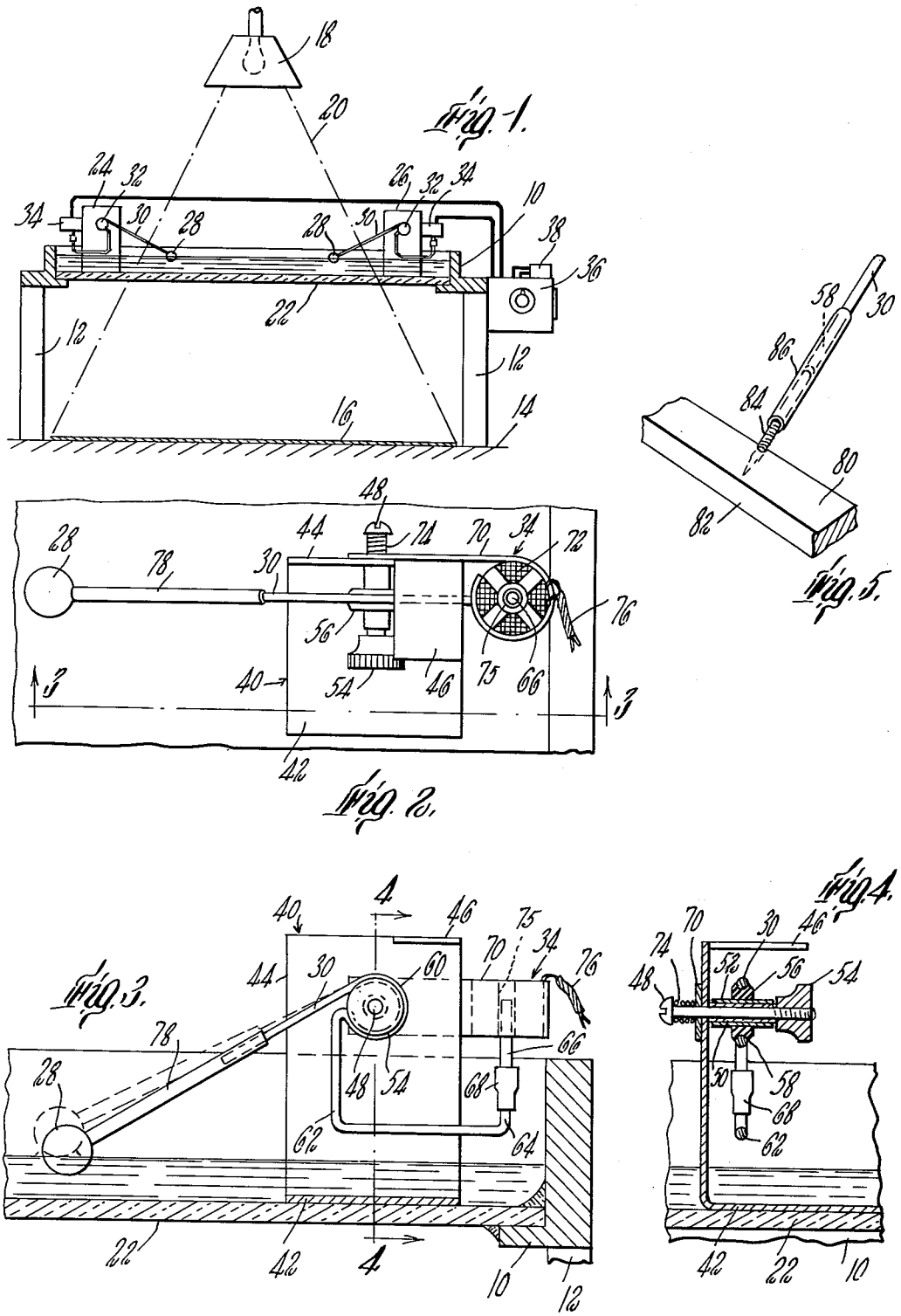

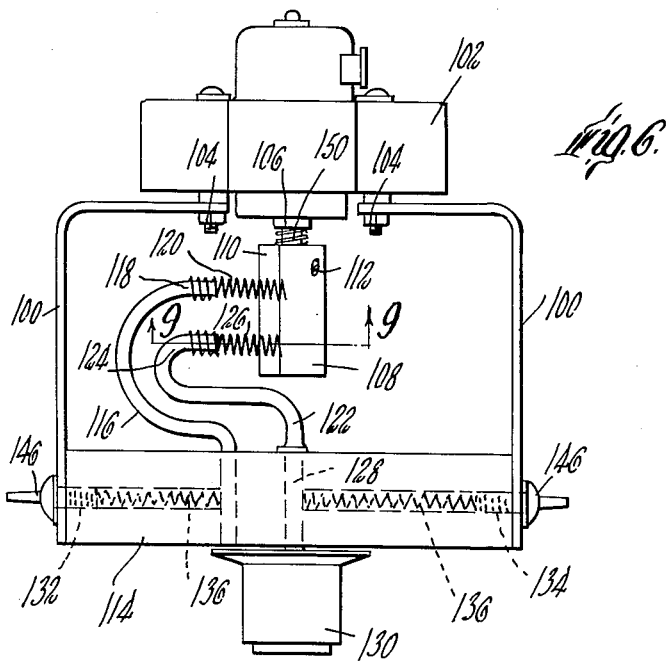
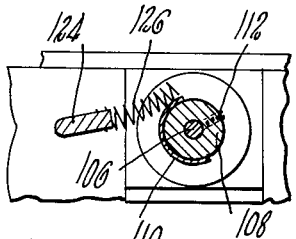
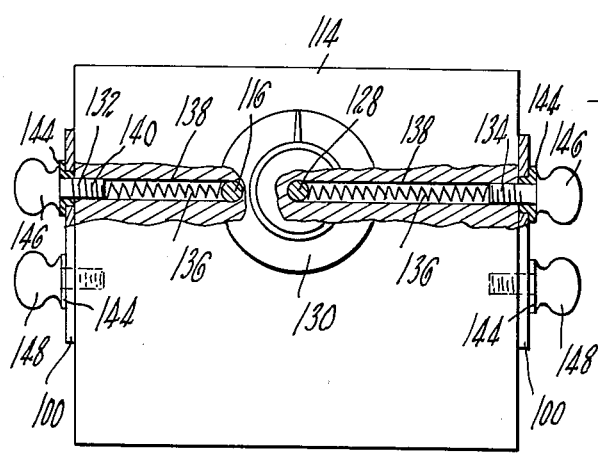
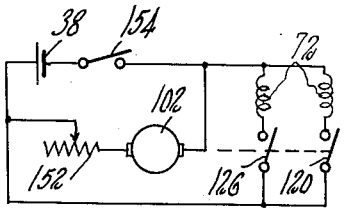
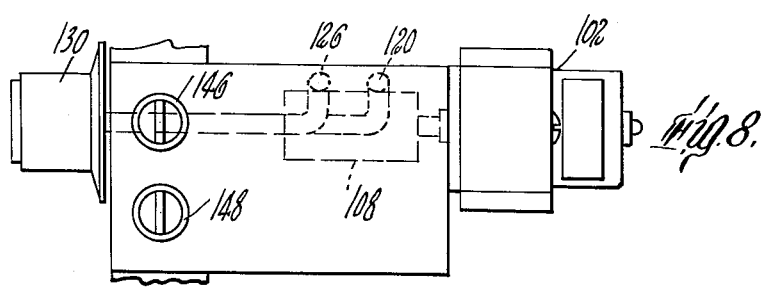

United States Patent Office 3,142,908
Patented Aug. 4, 1964

3,142,908
WAVE GENERATING APPARATUS
Martin Annis, Waban, and Edwin C. Williams, Jr., Southboro, Mass., assignors to American Science and Engineering, Inc., Cambridge, Mass., a corporation of Massachusetts
Filed July 19, 1962, Ser. No. 210,946
27 Claims. (Cl. 35—19)

This invention relates to demonstration devices and more particularly to apparatus especially adapted for demonstrating interference patterns of transverse waves.

Interference phenomena may be demonstrated in a laboratory or classroom by subjecting a suitable wave propagating medium, such as water, to controlled periodic distortions to generate waves. Frequently a ripple tank having a transparent bottom with water as the wave propagating medium therein is employed. By placing a light source above the tank and a projection screen surface below the tank, light rays are selectively transmitted through the water and the transparent tank bottom so that the generated wave patterns may be viewed and analyzed. While the techniques for performing such demonstrations and analyses have been known and used the results obtainable with relatively inexpensive equipment heretofore available have not been particularly reliable or reproducible due, for example, to extraneous wave interference factors introduced by the equipment. In addition, many of these demonstration devices required that the operator be very familiar with the particular device because of certain idiosyncratic characteristics and/or because of design limitations which make many wave interference demonstrations difficult to perform.

Accordingly, it is an object of this invention to provide improved apparatus for demonstrating wave interference patterns.

Another object of the invention is to provide an improved wave interference demonstration system employing a plurality of wave generators and a ripple tank structure.

Another object of the invention is to provide an improved wave demonstration system including a novel variable phase apparatus for controlling the energization of wave generators.

A further object of the invention is to provide a novel and improved wave generator.

Still another object of the invention is to provide a novel and improved wave generator which is inexpensive in construction and is characterized by ease of operation, versatility in the number and type of wave patterns that may be generated, and accuracy in the generation of those wave patterns.

A further object of the invention is to provide an improved signal phase control mechanism particularly adapted for use in ripple tank wave generator control systems.

Another object of the invention is to provide a variable phase switch mechanism that is simple, inexpensive in construction and reliable in operation.

Other objects, features and advantages of the invention will be seen as the following description of a preferred embodiment thereof progresses in conjunction with the drawings, in which:

FIG. 1 is a diagrammatic view of a wave interference demonstration system constructed in accordance with principles of the invention;

FIG. 2 is a top view of a wave generator constructed in accordance with principles of the invention employed in the ripple tank system shown in FIG. 1;

FIG. 3 is a sectional view of the wave generator and ripple tank taken along the line 3—3 of FIG. 2 showing a wave generator in elevation;

FIG. 4 is a sectional view of the wave generator and ripple tank taken along the line 4—4 of FIG. 3;

FIG. 5 is a perspective view of a second form of wave generating member used with the wave generator apparatus shown in FIGS. 2, 3 and 4;

FIG. 6 is a top view of a phase control switch constructed in accordance with the principles of the invention employed in the system shown in FIG. 1;

FIG. 7 is a front view of the variable phase control switch shown in FIG. 6, in partial section;

FIG. 8 is a side view of the variable phase control switch shown in FIG. 6;

FIG. 9 is a sectional view of the variable phase control switch contact elements taken along the line 9—9 of FIG. 6; and FIG. 10 is a schematic diagram of the electrical control circuitry employed in the wave demonstration system of FIG. 1.

With reference to FIG. 1 there is shown a tank 10 mounted on supports 12 in spaced relation to a base member 14. A projection screen 16 is on that base member and above the tank is light source 18 whose rays 20 are directed through the transparent glass sheet 22 which forms the bottom of the tank onto the surface of the projection screen.

The transparent bottom 22 of the tank is suitably sealed so that a thin layer of liquid such as water, in the order of ¼" in thickness, for example, may be held in the tank. Positioned in the tank are two wave generators 24, 26. These wave generators each include a spherical wave initiating member 28 preferably having sufficient positive buoyancy so that more than half of the sphere is above the surface of the water. Each sphere 28 has a non-wetting surface and is mounted on a rocker arm 30 that is rotated about a pivot or fulcrum point 32 by an actuator 34. The actuators of the generators are controlled in coordinated manner by a variable phase control switch generally indicated at 36 and the system is powered from a suitable source of electrical energy such as battery 38.

The details of the wave generators may be better understood with reference to FIGS. 2–4. Each wave generator unit is supported on a support bracket 40 formed from a sheet of aluminum—approximately 1/16" in thickness. The support bracket includes a flat base 42 which has a smooth lower surface that contacts the glass 22 and over which a substantial amount of the liquid in the tank is disposed. The smooth lower surface of the base, in contact with the smooth surface of the ripple tank bottom, provides a sturdy base for the operation of the wave generator. In addition, the support is relatively thin with respect to the depth of wave transmitting medium so that relatively little distortion of that medium results and adverse effects on wave formation are minimized. While the wave generator is easily moved along the bottom, the base provides a stable support, and with the balanced force design of the movable wave generating component, it provides a system support so that any distortions that are introduced in the liquid due to the operation of the wave generator itself are of negligible magnitude. The support bracket further includes a vertical member 44 of similar thin cross section, which cross section is disposed perpendicular to the direction of wave generation by the wave initiator member so that it produces a minimal reflection and distortion. The upper end of the vertical support bracket is bent to provide a reference member in the form of tab 46 which aids in the positioning of the height of the wave generator member 28 as desired within the tank.

Mounted on the vertical member 44 is the rippler pivot structure which includes a bolt 48 located coaxially with the pivot point 32 of the wave generator system. On an intermediate portion of the bolt are mounted two concentric sleeves 50, 52, sleeve 50 being secured against the inner surface of support member 44 by nut 54. Disposed on the outer sleeve 52 in firm friction engagement therewith is a rubber grommet 56 that has a cylindrical inner surface which engages the outer surface of sleeve 52 and a groove 58 in its outer periphery in which is secured the wave generator rocker arm 30. This arm is formed from a stiff metal rod and has a wave initiator support portion extending forwardly and downwardly from the pivot point 32. An intermediate circular clamping portion 60 is snapped into the cylindrical groove 58 of grommet 56 for securing thereto. Below the pivot point the rod is formed with a pendulum portion 62 that extends down and then is bent rearwardly. Finally, the rod extends upwardly to a terminal portion 64 to which is secured a cylindrical Alnico magnet 66. The joint between the magnet 66 and the end 64 of the rocker arm 30 is accomplished by a flexible tubing 68.

The support bracket 70 for the actuator 34 is frictionally secured to the vertical frame member 44 by the cooperation of bolt 48 and a spring 74 which is interposed between the head of the bolt and the support bracket member 70. The rear end of the support bracket is formed to receive a coil 72 which has a central aperture 75 into which the cylindrical magnet 66 enters. Leads 76 are brought out from the magnet coil 72 and connected to the variable phase switch unit 36.

The wave initiator 28 illustrated in FIGS. 1–4 is a spherical member mounted on a rigid tube 78 that is slid onto and secured in frictional engagement with the forward end of the rocker rod 30. This ball 28 initiates circular wave patterns. If desired a plurality of balls may be similarly supported in rigid aligned relation on a single rocker rod to produce modified wave patterns. The rigid connection provided by tube 78 has the advantage of eliminating certain harmonic wave effects introduced where flexible connections are employed. In operation the sphere is lifted when the coil is energized but not entirely free of the water surface so that a clean wave is generated.

A second form of wave initiator structure is shown in FIG. 5. That structure includes a rectangular rod of balsa wood 80 having a vertical forward surface 82. The rod is secured by a threaded connector 84 to a flexible connection in the form of rubber tubing 86 which slides on and is secured frictionally to the end 58 of the wave generator rod 30. This wave initiator also floats in the water and thus imposes practicaly no load on the wave generator structure. Straight waves are initiated by the repetitive energization of the magnetic coil 72 which produces periodic movement of the rocker arm 30 and that movement is flexibly coupled to rock the balsa wood rod about its long axis in the water, cyclically changing the position of the flat front surface and thus generating clean waves. Other types of wave initiator structures having curved surfaces, for example, such as cones or hemispheres may also be desirably employed in certain types of wave generation experiments.

In the embodiment illustrated in FIGS. 1–4 energization of the coil 72 will move the ball 28 in a slight arc through a range indicated generally by dotted lines. The amplitude may vary as a function of the design and nature of components of the wave generator structure and as a function of magnitude and frequency of the coil energizing signal. Further, the structure is easily adjustable to compensate for changes in power and the height of the wave generating medium so that the desired clean waves may be easily obtained.

The magnetic coils 72 of the two wave generator units are connected through the variable phase master control switch shown in FIGS. 6–9 to the energizing source 38. That switch includes a support bracket structure 100 on which a small D.C. electric motor 102 is secured by bolts 104. The motor has an output shaft 106 on which is mounted a cylinder 108 of conductive metal such as brass or copper. A portion of the outer surface of the cylinder is rendered electrically non-conductive, for example by the use of a rectangular sheet of vinyl electrical insulation tape 110 in the order of seven mils in thickness. In this embodiment the cylinder surface is divided into conductive and non-conductive zones of equal area. The cylinder 108 is secured to the motor output shaft by means of set screw 112.

Also mounted on the framework bracket members, at the ends opposite the motor support, is an insulating member 114 of suitable electrical insulating material such as wood or plastic. Supported in fixed relation in the insulating block 114 is a conductor rod 116 having a terminal end 118 extending perpendicular to the axis of rotation of the motor shaft 106. A coil spring contact 120 of beryllium copper is secured to rod end 118 for resilient engagement with cylinder 108. A second similarly formed conductor rod 122 formed in similar configuration has secured at its terminal end 124 a second coil spring contact 126 which similarly resiliently engages cylinder 108. The conductor member 122 is supported on the insulator 114 by a shaft portion 128 which extends through the insulating block and has an insulated knob 130 secured thereto so that conductor member 122 may be rotated in either direction through 360° and beyond by manipulation of knob 130 to change the position of contact 126 relative to the position of switch contact 120. The shaft portion 128 is mounted concentrically with the output shaft 106 and with the axis of cylinder 108.

Electrical contact between each conductor member 116, 122 and terminals 132, 134 respectively is accomplished by a coil spring 136 disposed in recess 138 in the insulating block 114. Each terminal member includes a threaded portion 140 and a flat seating surface. A flanged insulating washer 144 on the shank of the terminal member and seated against the seating surface spaces the terminal member from the support bracket 100 as best indicated in FIG. 7. Each terminal member has a handle portion 146 which enables it to be manipulated by hand so that electrical connections between the terminals and the magnetic coils may be readily made. The threaded portions 140 engage cooperating thread elements in the insulating block 114 and maintain the springs 136 in firm engagement with conductor members 116, 122. Securing members 148, which may be of the same configuration as terminal members 132, 134 provide additional means securing the bracket structure 100 to the insulating block 114.

The power source is connected to the cylinder 108 by connecting one terminal of that source to the motor case so that the motor case and coil spring 150 disposed on the output shaft 106 complete a conductive path to the cylinder. When the motor is rotated the switch members open and close respective circuits at the same frequency but in phase relation that is continuously adjustable over the entire 360° range. The variable phase control device is inexpensive while being reliable in operation. The coil spring contacts, in resilient contact with the half insulated and half conductive cylinder surface, form precise switching circuit elements which do not build up contaminants on the surface of the cylinder that adversely affect the accuracy of energization and de-energization of the electrical circuits.

A schematic diagram of the electrical circuitry of the wave generator system is shown in FIG. 10. Battery 38 is connected in series with the motor 102 through a variable resistance 152 to provide motor speed control. When control switch 154 is closed, the motor operates the two switches (designated 120, 126) (the operations of which are adjustable in phase relative to one another) to control the energization of magnetic coils 72 of the wave generator actuators 34.

In operation, the system may be set up as in FIG. 1 with the wave generators positioned opposite one another and supported in the tank on the bottom thereof. The wave initiator members 28 float on the water surface and the coil support brackets 70 are appropriately adjusted so that clean waves are generated when the circuit is energized by closing the battery circuit switch 154.

After the closing of switch 154 to energize the motor and wave generator circuits, the wave generators are operated at a rate controlled by the motor speed through adjustment of the variable resistance 152 to provide waves of desired frequency for demonstration purposes. The two wave sources generate waves which proceed towards one another and interact to produce interference patterns. Shadows of those patterns are observable on the projection screen surface 16 positioned below the tank. The generators may be positioned in other locations, such as side by side, to demonstrate other wave interference effects. In another arrangement the light source is positioned below the tank and the projected wave patterns are displayed on a screen surface positioned above the tank.

The configuration of each generator rocker arm 30 results in a balanced stable unit. Actuation of the rocker arm under the influence of electromagnetic forces of small magnitude produces a rocking action on the low friction pivot. Each displacement of the rocker arm produces a restoring force due to the pendulous configuration of the arm which returns the unit to its stable neutral position. Through simple rotative adjustment of the support bracket 70 the coil 72 is moved with resultant adjustment of the position of the wave initiator 28 relative to the water surface so that the amplitude of the generated waves may be easily controlled and effectively varied to produce a focusing action whereby strong and weak areas of light transmission may be established. Also the ease of adjustment enables compensation for different liquid levels to be readily made. Wave interference effects that are dependent on the phase of one wave with respect to the other may be easily demonstrated through adjusting of the variable phase switch unit 36 by rotating knob 130. With this apparatus a variety of wave interactions may be easily demonstrated and reliably reproduced by unskilled operators. The wave generators are inexpensive, balanced structures which introduce substantially no distortion or extraneous wave generation due to the design of the support and actuating system. Their design is such that they may be adjusted to change phase position, frequency and amplitude characteristics while they are operating. The variable phase switch mechanism also is an inexpensive structure which provides a continuously variable phase control for switching purposes over the entire 360° range and is particularly useful in driving the wave generators in a wave interference demonstration.

While preferred embodiments of the invention have been shown and described various modifications thereof will be obvious to those skilled in the art and therefore it is not intended that the invention be limited to the described embodiments or to details thereof and departures may be made therefrom within the spirit and scope of the invention as defined in the claims.

We claim:

1. Wave generating apparatus comprising
   two wave generators adapted to be spaced apart for acting on a wave propagating medium to generate waves therein,
   each said wave generator including a support structure adapted to be positioned in said wave propagating medium,
   wave generating means pivotally mounted on said support structure at a point above the surface of said wave propagating medium,
   said wave generating means including a wave initiating member positioned forwardly from said pivot point, a pendulous member extending downward from said pivot point, and an actuator member positioned rearwardly from said pivot point,
   and electromagnetic means cooperating with said actuator member for moving said wave generating element about said pivot point to move said wave initiating member in a direction generally perpendicular to the surface of said wave propagating medium to generate waves therein,
   a power source for energizing said electromagnetic means to drive said wave generators for generating waves in said medium,
   and control means connected in circuit between said power source and said wave generators to energize both said electromagnetic means at the same frequency to generate waves in said medium,
   said control means including means to vary the relative phase of the energizing signals applied to said wave generators.

2. The wave generating apparatus as claimed in claim 1 wherein said support member is a thin sheet member including a base element having a smooth lower surface adapted to rest below the surface of the liquid in which waves are to be propagated,
   and a vertical support element disposed at a right angle to said lower surface, on which said wave generating means is pivotally supported for pivoting about an axis parallel to the lower surface of said base,
   the thickness of the surfaces of each said base and said vertical support elements nearest said wave initiating member being small relative to the width of those surfaces.

3. The wave generating apparatus as claimed in claim 1 wherein said electromagnetic means includes a coil mounted on a support bracket secured to said support member for rotational movement about the same pivot point as said wave generating means.

4. The wave generating apparatus as claimed in claim 1 wherein said wave initiating member has a curved wave generating surface having non-wettable characteristics with respect to said wave propagating medium.

5. The wave generating apparatus as claimed in claim 1 wherein said wave initiating member has an elongated flat surface disposed in and generally perpendicular to the surface of said wave propagating medium.

6. The wave generating apparatus as claimed in claim 1 wherein said wave initiating member is made of material less dense than said wave propagating medium,
   and wherein said wave generating means further includes flexible coupling means between said pivot point and said wave initiating member.

7. The wave generating apparatus as claimed in claim 1 wherein said wave generating means comprises a rod having a first portion extending forwardly and downwardly from the pivot point,
   a second portion extending from the pivot point downwardly to form said pendulous member,
   and a third portion extending rearwardly from said second portion to which said actuator member is attached,
   said actuator member is a magnetic element, and
   said electromagnetic means includes a coil having an aperture into which said magnetic element moves under the influence of a magnetic field created by the energization of said coil.

8. Wave generating apparatus comprising
   two wave generators adapted to be spaced apart for acting on a wave propagating medium to a generate waves therein,
   a power source for driving said wave generators to generate waves in said medium,
   and control means connected in circuit between said power source and said wave generators to energize both said generators at the same frequency to generate waves in said medium,
   said control means including a cylinder mounted for rotation about its axis,
   said cylinder having a first axially extending surface portion of electrically conductive material and a second axially extending surface portion of electrically insulating material, first and second contacts to alternately engage said first and second surface portions of said cylinder as said cylinder is rotated, means to move said first contact relative to said second contact to vary the relative phase of the energizing signals applied to said wave generators, and means for applying an electric signal to said first surface portion for application to said first and second contacts during the periods of their engagement therewith.

9. The wave generating apparatus as claimed in claim 8 wherein said first contact is mounted for radial movement about the axis of said cylinder.

10. The wave generating apparatus as claimed in claim 8 wherein said cylinder is made of a copper containing material and said second surface portion is formed by a thin strip of electrically insulating material secured on the surface of said cylinder.

11. The wave generating apparatus as claimed in claim 8 wherein each of said contact members includes a helical spring biased into engagement with said cylinder surface.

12. Wave generating apparatus comprising two wave generators adapted to be spaced apart for acting on a wave propagating medium to generate waves therein, each said wave generator including a support structure adapted to be positioned in said wave propagating medium, wave generating means pivotally mounted on said support structure at a point above the surface of said wave propagating medium, said wave generating means including a wave initiating member positioned forwardly from said pivot point, a pendulous member extending downward from said pivot point, and an actuator member positioned rearwardly of said pivot point, and electromagnetic means cooperating with said actuator member for moving said wave generating element about said pivot point to move said wave initiating member in a direction generally perpendicular to the surface of said wave propagating medium to generate waves therein, a power source for energizing said electromagnetic means to drive said wave generators for generating waves in said medium, and control means connected in circuit between said power source and said wave generators to energize both said electromagnetic means at the same frequency to generate waves in said medium, said control means including a cylinder mounted for rotation about its axis, said cylinder having a first axially extending surface portion of electrically conductive material and a second axially extending surface portion of electrically insulating material, first and second contacts connected to said electromagnetic means of respective wave generators, each said contact being arranged to alternately engage said first and second surface portions of said cylinder as said cylinder is rotated, means to move said first contact relative to said second contact to vary the relative phase of the energizing signals applied to said wave generators, and means for applying an electric signal to said first surface portion for application to said first and second contacts during the periods of their engagement therewith.

13. A wave generator for generating waves in a wave propagating medium, comprising a support structure adapted to be positioned in said wave propagating medium, wave generating means pivotally mounted on said support structure at a point above the surface of said wave propagating medium, said wave generating means including a rod having a first portion extending forwardly and downwardly from the pivot point, a wave initiating member secured to said first portion, a second portion extending from the pivot point downwardly to form a pendulous member, and a third portion extending rearwardly from said second portion, a magnetic element attached to said third portion, and electromagnetic means including a coil having an aperture into which said magnetic element moves under the influence of a magnetic field created by the energization of said coil for moving said wave generating means about said pivot point to move said wave initiating member in a direction generally perpendicular to the surface of said wave propagating medium to generate waves therein.

14. The wave generator as claimed in claim 13 wherein said support member is a thin sheet member including a base element having a smooth lower surface adapted to rest below the surface of the liquid in which waves are to be propagated, and a vertical support element disposed at a right angle to said lower surface, on which said wave generating means is pivotally supported for pivoting about an axis parallel to the lower surface of said base, the thickness of the surfaces of each said base and said vertical support elements nearest said wave initiating member being small relative to the width of those surfaces.

15. The wave generator as claimed in claim 13 wherein said electromagnetic means includes a coil mounted on a support bracket secured to said support member for rotational movement about the same pivot point as said wave generating means.

16. The wave generator as claimed in claim 13 wherein said wave initiating member is a sphere.

17. The wave generator as claimed in claim 13 wherein said wave initiating member is a rod disposed parallel to the surface of said wave propagating medium.

18. The wave generator as claimed in claim 13 wherein said wave initiating member is made of material less dense than said wave propagating medium, and wherein said wave generating means further includes flexible coupling means between said pivot point and said wave initiating member.

19. A wave generator for generating waves in a wave propagating medium, comprising a support structure, wave generating means pivotally mounted on said support structure at a point above the surface of said wave propagating medium, said wave generating means including a wave initiating member having a curved wave generating surface of non-wettable characteristics with respect to said wave propagating medium, said wave initiating member being positioned forwardly and downwardly from said pivot point, a pendulous member extending downward from said pivot point, and an actuator member positioned rearwardly of said pivot point so that said wave initiating member floats in said wave propagating medium when said wave generating means is in equilibrium, and means cooperating with said actuator member for rotating said wave generating element about said pivot point to raise said wave initiating member relative to the surface of said wave propagating medium to generate waves therein.

20. A variable phase control device comprising a member mounted for rotation about its axis, said member having a first surface portion of electrically conductive material and a second surface portion of electrically insulating material, first and second contacts adapted to alternately engage said first and second surface portions of said member as said member is rotated, means to move said first contact relative to said second contact for adjusting the relative intervals that said contacts are in engagement with said first surface portion during each revolution of said member, and means for applying electrical energy to said first surface portion for application to said first and second contacts during the periods of their engagement therewith.

21. A variable phase control device comprising an electric motor having an output shaft,
   a cylinder mounted on said motor output shaft for rotation about its own axis,
   an electrically insulating support member secured in spaced relation to said electric motor,
   first and second contact members secured to said support member,
   each said contact member including a coil spring terminal element positioned in engagement with the surface of said cylinder,
   each portion of the surface of said cylinder engaged by a contact terminal element through a complete revolution of said cylinder including a first portion of electrically conductive material and a second portion of electrically insulating material so that each terminal element alternately engages the associated first and second portions as said cylinder is rotated,
   means to move said first and second contact members relative to one another for adjusting the relative times that said contact members are in engagement with their associated first surface portions during each revolution of said cylinder,
   means for applying an electric signal to said first surface portions for application to said first and second contact members during the periods that their terminal elements are in engagement therewith,
   and terminal means connected to each said contact member for transmitting the electric signal applied to each said contact member from the associated first surface portion.

22. The variable phase control device as claimed in claim 21 wherein said first contact member is mounted on said insulating member in fixed position relative to said second contact member and to the axis of rotation of said cylinder and said second contact member is mounted on said insulating member for radial movement about the axis of rotation of said cylinder,
   a radial movement of said second contact member being effective to change the phase relation between the electric signals transmitted by said first and second contact members.

23. A variable phase control device comprising a cylinder mounted for rotation about its axis,
said cylinder having a first axially extending surface portion of electrically conductive material and a second axially extending surface portion of electrically insulating material, first and second contacts adapted to alternately engage said first and second surface portions of said cylinder as said cylinder is rotated, means to move said first contact relative to said second contact for adjusting the relative time intervals that said contacts are in engagement with said first surface portion during each revolution of said cylinder, and means for applying an electric signal to said first surface portion for application to said first and second contacts during the periods of their engagement therewith.

24. The control device as claimed in claim 23 wherein said first contact is mounted for radial movement about the axis of said cylinder.

25. The control device as claimed in claim 23 wherein said cylinder is made of a copper containing material and said second surface portion is formed by a thin strip of electrically insulating material secured on the surface of said cylinder.

26. The control device as claimed in claim 23 wherein each of said contact members includes a helical spring biased into engagement with said cylinder surface.

27. A wave generator for generating waves in a wave propagating medium, comprising a support structure,
   wave generating means pivotally mounted on said support structure at a point above the surface of said wave propagating medium,
   said wave generating means including a wave initiating member having an elongated flat surface disposed in and generally perpendicular to the surface of said wave propagating medium, said wave initiating member being positioned forwardly and downwardly from said pivot point, a pendulous member extending downward from said pivot point, and an actuator member positioned rearwardly of said pivot point so that said wave initiating member floats in said wave propagating medium when said wave generating means is in equilibrium,
   and means cooperating with said actuator member for rotating said wave generating element about said pivot point to raise said wave initiating member relative to the surface of said wave propagating medium to generate waves therein.

References Cited in the file of this patent
UNITED STATES PATENTS

| | | |
|---|---|---|
| 1,825,739 | Klopsteg | Oct. 6, 1931 |
| 2,019,829 | Price | Nov. 5, 1935 |
| 2,570,766 | Chenault | Oct. 9, 1951 |
| 2,646,517 | Hirtreiter | July 21, 1953 |